(12) United States Patent
Hayashi

(10) Patent No.: US 7,598,866 B2
(45) Date of Patent: Oct. 6, 2009

(54) ELECTRONIC SERVICE PROVIDING SYSTEM, TERMINAL, WIRELESS TAG PROVIDING APPARATUS, AND SERVER DEVICE

(75) Inventor: Yugo Hayashi, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 210 days.

(21) Appl. No.: 11/481,005

(22) Filed: Jul. 6, 2006

(65) Prior Publication Data

US 2007/0013488 A1 Jan. 18, 2007

(30) Foreign Application Priority Data

Jul. 14, 2005 (JP) ............................. 2005-206074

(51) Int. Cl.
*G08B 13/14* (2006.01)
*G08G 1/09* (2006.01)
*G01C 21/00* (2006.01)
*G01S 3/02* (2006.01)

(52) U.S. Cl. .................... 340/572.1; 340/905; 701/200; 342/457

(58) Field of Classification Search ................ 340/905, 340/572.1; 701/200; 342/457; 455/405, 455/406, 407, 408, 409, 410, 411; 705/30, 705/32, 34; 379/114.3, 114.26, 133
See application file for complete search history.

(56) References Cited

U.S. PATENT DOCUMENTS

| | | | | |
|---|---|---|---|---|
| 5,917,913 A | * | 6/1999 | Wang | 705/67 |
| 6,764,003 B1 | * | 7/2004 | Marschitsch et al. | 235/383 |
| 7,194,438 B2 | * | 3/2007 | Sovio et al. | 705/50 |
| 7,343,329 B1 | * | 3/2008 | Sharp | 705/27 |
| 2003/0055738 A1 | * | 3/2003 | Alie | 705/26 |
| 2004/0002305 A1 | * | 1/2004 | Byman-Kivivuori et al. | 455/41.2 |
| 2005/0178829 A1 | * | 8/2005 | Rosenberg | 235/380 |
| 2006/0220838 A1 | * | 10/2006 | Wakim et al. | 340/539.12 |
| 2007/0027696 A1 | * | 2/2007 | Burger | 705/1 |

FOREIGN PATENT DOCUMENTS

JP 2003-236217 A 8/2003

* cited by examiner

*Primary Examiner*—Daniel Wu
*Assistant Examiner*—Fekadeselassie Girma
(74) *Attorney, Agent, or Firm*—Sughrue Mion, PLLC

(57) ABSTRACT

An electronic service providing system according to an embodiment of the invention includes: a cell phone; a server device for providing an electronic service; and a wireless tag providing unit for providing necessary information for receiving an electronic service like an ID or password with the information stored in the RFID wireless tag. The wireless tag providing unit sends a request for an electronic service to the server device and receives necessary information. The necessary information is written to the wireless tag. The server device 4 transmits necessary information to the wireless tag providing unit in response to the request. The cell phone reads necessary information from the wireless tag of the wireless tag providing unit, and an electronic service such as contents data is received from the server device based on the necessary information. Hence, it is possible to receive an electronic service from anywhere irrespective of place and service type.

7 Claims, 4 Drawing Sheets

| ID | PASSWORD | SERVICE NAME | DEPOSIT | AVAILABLE PERIOD | MAXIMUM FREQUENCY OF USE |
|---|---|---|---|---|---|
| 001 | 1234 | MUSIC 1 | 300 yen | 30 DAYS | 10 TIMES |
| 002 | 2345 | MUSIC 2 | 500 yen | 30 DAYS | UNLIMITED |
| 003 | 3456 | IMAGE 1 | 700 yen | 15 DAYS | 5 TIMES |
| ⋮ | ⋮ | ⋮ | ⋮ | ⋮ | ⋮ |

Fig. 3

| ID | PASSWORD | DATA |
|---|---|---|
| 001 | 1234 | MUSIC 1 ····· |
| 002 | 2345 | MUSIC 2 ····· |
| ⋮ | ⋮ | ⋮ |

Fig. 4

| ID | PASSWORD | SERVICE NAME | DEPOSIT | AVAILABLE PERIOD | MAXIMUM FREQUENCY OF USE |
|---|---|---|---|---|---|
| 001 | 1234 | MUSIC 1 | 300 yen | 30 DAYS | 10 TIMES |
| 002 | 2345 | MUSIC 2 | 500 yen | 30 DAYS | UNLIMITED |
| ⋮ | ⋮ | ⋮ | ⋮ | ⋮ | ⋮ |
| 100 | A001 | MUSIC 100 | 300 yen | 30 DAYS | 5 TIMES |
| 101 | A002 | MUSIC 101 | 300 yen | 30 DAYS | 5 TIMES |
| ⋮ | ⋮ | ⋮ | ⋮ | ⋮ | ⋮ |

Fig. 5

ELECTRONIC SERVICE PROVIDING SYSTEM, TERMINAL, WIRELESS TAG PROVIDING APPARATUS, AND SERVER DEVICE

BACKGROUND OF THE INVENTION

1. Field of the Invention

The present invention relates to an electronic service providing system, a terminal, wireless tag providing apparatus, and a server device. In particular, the invention relates to a technique of delivering an electronic service to a terminal from a server device using an RFID (Radio Frequency Identification) wireless tag.

2. Description of Related Art

In recent years, attentions have been paid to RFID-based systems, and the systems have been used for various applications. The basic configuration of the RFID-based system includes an RFID reader/writer that communicates with an RFID wireless tag by radio, and a computer terminal that controls the RFID reader/writer. The RFID reader/writer can read/write data to/from the RFID tag. There are RFID tags of various types such as a label type, a card type, a coin type, and a stick type. A suitable one is selected from the various types in accordance with an application. The communication range is several mm to several tens of mm, and is appropriately selected in accordance with the application.

As conventional RFID systems, Japanese Unexamined Patent Application Publication No. 2003-236217 discloses a rental system of a game medium used in a pachinko machine or the like. According to the system, when this game medium is lent using an IC seal (corresponding to the RFID tag) having an ID number, frequency data is recorded into a memory of a seal vending machine or coil machine connected via LAN in association with the ID number of the IC seal.

However, the technique as disclosed in Japanese Unexamined Patent Application Publication No. 2003-236217 requires the installation of a special machine having a memory, such as the seal vending machine or the coil machine in the store. Hence, the IC seal cannot be used in another shop, and the system itself is exclusively used. As a result, an IC card differs from shop to shop. In addition, the IC card can be used only in designated places.

SUMMARY OF THE INVENTION

An electronic service providing system according to an aspect of the present invention includes: a terminal capable of transmitting/receiving data to/from a wireless tag; a service device that transmits/receives data to/from the terminal through a network line to provide an electronic service to the terminal through the network line; and a wireless tag providing apparatus that transmits/receives data to/from the server device to provide necessary information for receiving the electronic service provided by the server device with the information stored in the wireless tag, the server device including a communication unit that receives a request for an electronic service from the wireless tag providing apparatus, transmits the necessary information for receiving the electronic service to the wireless tag providing apparatus, and provides the terminal with the electronic service based on the necessary information transmitted from the terminal through the network line, the wireless tag providing apparatus including: an input unit for sending the request for an electronic service to the server device through key entry; a communication unit for sending the request for the electronic service entered with the input unit and receiving the necessary information transmitted from the service device; and a wireless tag providing unit for writing the necessary information received with the communication unit into the wireless tag to provide the wireless tag that stores the necessary information, and the terminal including: a short-distance wireless communication unit for reading the necessary information stored in the wireless tag; and a communication unit that transmits/receives data to/from the server device based on the necessary information read by the short-distance communication unit to receive the electronic service from the server device through the network line.

Owing to the above configuration, the terminal receives an electronic service from the server device based on information recorded on the wireless tag via a network, so the terminal can receive an electronic service from anywhere irrespective of place or service type.

BRIEF DESCRIPTION OF THE DRAWINGS

The above and other objects, advantages and features of the present invention will be more apparent from the following description taken in conjunction with the accompanying drawings, in which:

FIG. 3 shows the internal configuration of an RFID data recording area of a memory of a cell phone;

FIG. 4 shows the internal configuration of a memory of an RFID wireless tag; and FIG. 5 shows the internal configuration of a memory of a server device.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Embodiment

The configuration of an electronic service providing system according to an embodiment of the present invention is described with reference to the accompanying drawings.

Figure 1:
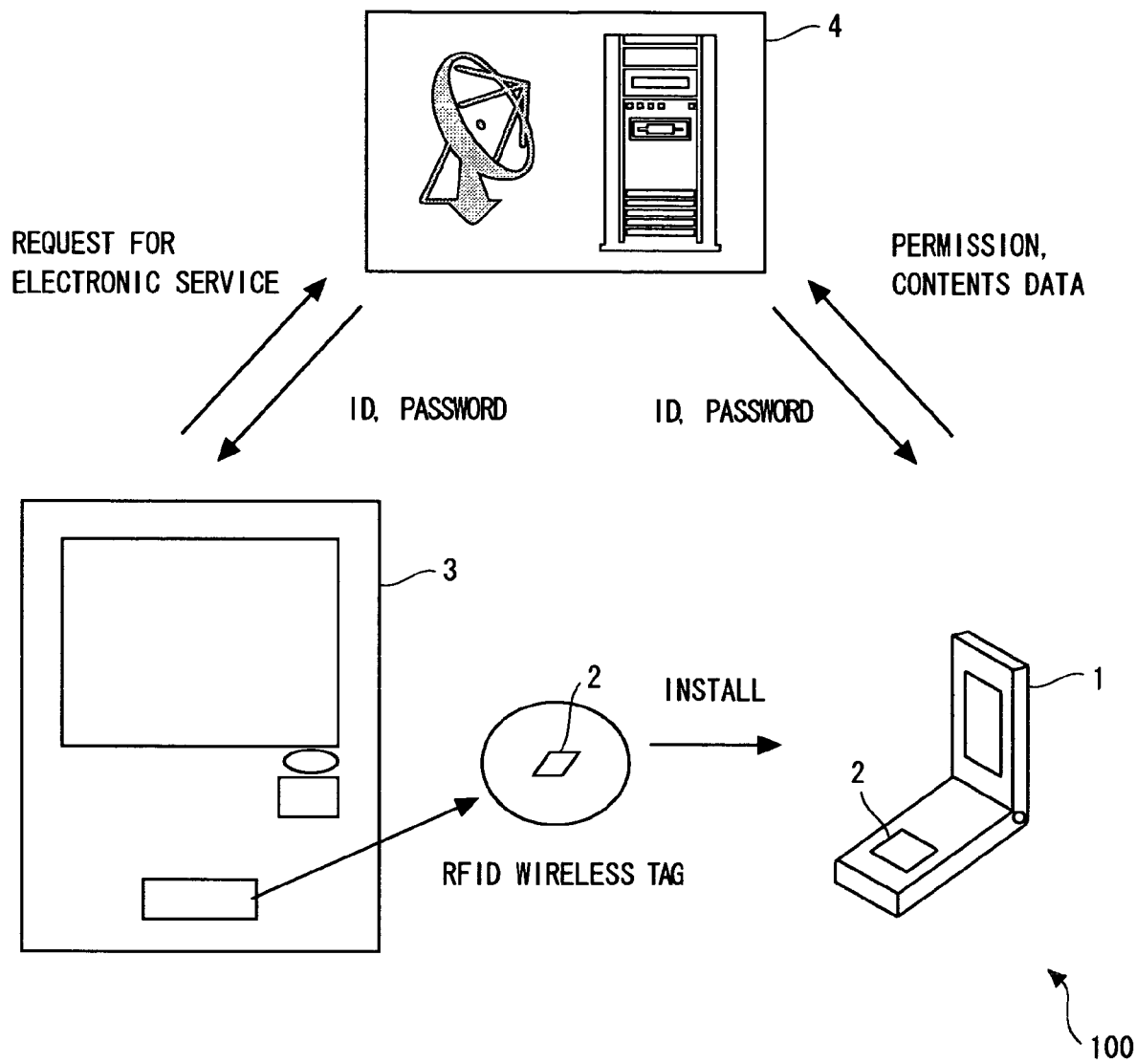
FIG. 1 is a schematic diagram of an electronic service providing system according to an embodiment of the present invention.

FIG. 1 is a schematic diagram of the electronic service providing system of this embodiment.

Figure 2:
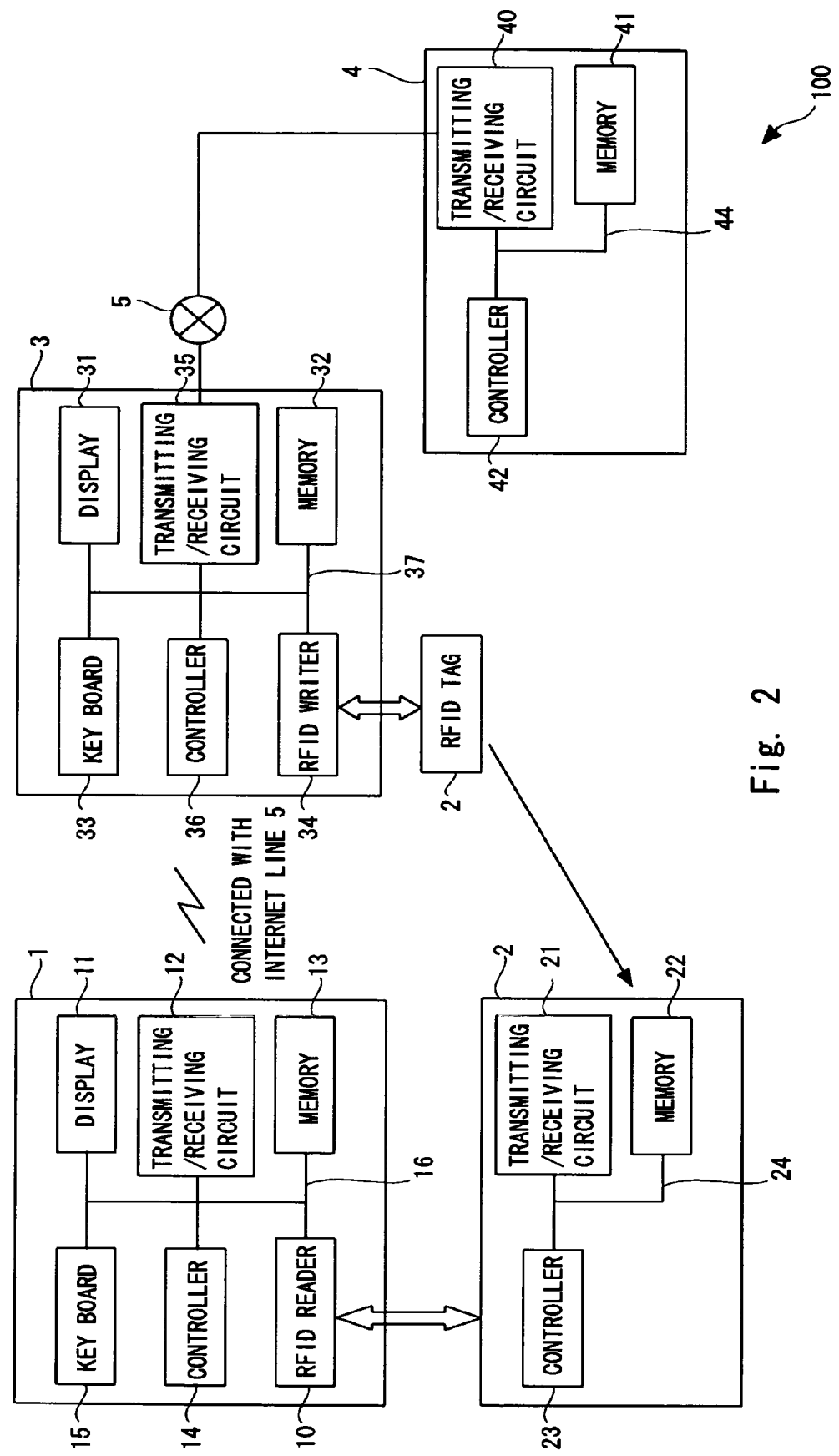
FIG. 2 is a schematic diagram of the electronic service providing system of the embodiment of the present invention.

FIG. 2 shows the configuration of the electronic service providing system of this embodiment.

As shown in FIGS. 1 and 2, an information system 100 of this embodiment includes a cell phone 1 as a terminal, an RFID wireless tag providing unit 3, and a server device 4. Incidentally, the RFID wireless tag providing unit 3 is incorporated in or attached to a vending machine for canned drink. FIG. 1 shows the appearance of the vending machine for canned drink that incorporates the RFID wireless tag providing unit 3 as the RFID wireless tag providing unit 3. FIG. 2 shows only main components of the RFID wireless tag providing unit 3.

As shown in FIGS. 1 and 2, the cell phone 1 can transmit/receive data to/from the RFID wireless tag 2. The RFID wireless tag 2 can be issued from the RFID wireless tag providing unit 3. The RFID wireless tag 2 is used in the form of being attached to the cell phone 1 with an adhesive. The cell phone 1 transmits/receives data to/from the server device 4. The server device 4 transmits/receives data to/from the cell phone 1 through a network line 5. Further, the server device 4 authenticates an ID of the RFID wireless tag 2 sent from the cell phone 1, and provides a notification to allow the provision of an electronic service or provides an electronic service for contents data, to the cell phone 1 through the network line 5. The wireless tag providing unit 3 transmits/receives data to/from the server device 4. Further, the wireless tag providing unit 3 provides information for receiving an electronic service provided by the server device 4 with the information stored in the RFID wireless tag 2. The wireless tag providing unit 3 sends a request to purchase desired content among the contents provided by the server device 4 to the server device 4. In response to the request to purchase the content from the wireless tag providing unit 3, the server device 4 sends an ID necessary for using the content or a password corresponding to the ID to the RFID wireless tag providing unit 3 as a sender of the request.

As shown in FIG. 2, the cell phone 1 includes an RFID reader 10 as a short-distance wireless communication unit, a display 11, a transmitting/receiving circuit 12 as a communication unit, a memory 13 as a storage unit, a keyboard 15 as an input unit, and a controller 14 as a control unit. These components and circuits are connected through a control bus 16.

The RFID reader 10 reads information (information necessary for receiving an electronic service provided by the server device 4) stored in the RFID wireless tag 2 under the control of the controller 14. Incidentally, an RFID reader/writer for reading/writing data from/to the RFID wireless tag 2 can be used in place of the RFID reader 10.

The display 11 is composed of a liquid crystal display device or an organic EL display device, for example, and displays a character string input with the keyboard 15 or contents of the electronic service provided by the server device 4 under the control of the controller 14.

The transmitting/receiving circuit 12 transmits/receives data to/from the server device 3 based on information read by the RFID reader 10 to receive an electronic service from the server device 3 through the network line 5. In general, the cell phone 1 is connected with the Internet (network line 5) through a base station (not shown) connected with the network line 5.

The memory 13 has an RFID storage area (not shown) for storing information stored in the RFID wireless tag 2 (information necessary for receiving an electronic service provided by the server device 3). As shown in FIG. 3, the RFID storage area has an area for recording an ID number, a password, a service name, an amount of deposit, an available period, the maximum frequency of use, or the like.

The controller 14 controls all the components and circuits (10 to 13, and 15) connected via the control bus 16, and controls all the circuits of the cell phone 1.

The keyboard 15 has plural function keys and symbol keys, and these keys are arranged on the front side of the cell phone 1, for example.

As shown in FIG. 2, the RFID wireless tag 2 includes a transmitting/receiving circuit 21 for transmitting/receiving data to/from the cell phone 1 or the RFID wireless tag providing unit 3, a memory 22 for storing data to be transmitted or received data, and a controller 23 for controlling the entire RFID wireless tag 2 including the transmitting/receiving circuit 21 or the memory 22. These components (21 to 23) are connected through a control bus 24.

As shown in FIG. 4, the memory 22 has an area for storing an ID number used as unique identification data of the RFID, a password, and data about the ID (similar to "service name" of FIG. 3 but omitted from FIG. 4).

As shown in FIG. 2, the RFID wireless tag providing unit 3 is incorporated in or attached to a vending machine for canned drink, for example. Further, the RFID wireless tag providing unit 3 includes a display 31, a memory 32 as a storage unit, a keyboard 33 as an input unit, an RFID writer 34 as an RFID wireless tag providing unit, a transmitting/receiving circuit 35 as a communication unit, and a controller 36 as a control unit. These components (31 to 36) are connected via a control bus 37.

The display 31 is composed of, for example, a liquid crystal display device or an organic EL (Electro Luminescence) display device, and displays a character string or other such data input with the keyboard 33 under the control of the controller 36.

The memory 32 has an area for temporarily storing information necessary for receiving an electronic service provided by the server device 4. More specifically, the temporarily storing information necessary for receiving an electronic service provided by the server device 4 is an ID number or a password, or data about the ID, and is the same as the contents of FIG. 4. Hence, repetitive description thereof is omitted.

The keyboard 33 is composed of plural function keys or symbol keys, and these keys are arranged on the front side of the RFID wireless tag providing unit 3, for example. The keyboard 33 is used for inputting a request for an electronic service toward the server device 4.

The RFID writer 34 writes information necessary for receiving an electronic service provided by the server device 3 to the memory 22 of the RFID wireless tag 2 to provide the RFID wireless tag 2 that records the information necessary for receiving the electronic service provided by the server device 3 under the control of the controller 36. More specifically, the RFID writer 34 writes the information necessary for receiving the electronic service provided by the server device 4, which is temporarily stored in the memory 32, to the memory 22 of the RFID wireless tag 2. Incidentally, an RFID reader/writer that can write/read data to/from the RFID wireless tag 2 can be used in place of the RFID writer 34.

The transmitting/receiving circuit 35 sends a request to provide an electronic service, which is input with the keyboard 33, to the server device 4 via the Internet line 5. Further, the transmitting/receiving circuit 35 receives the information necessary for receiving the electronic service provided by the server device 3 through the Internet line 5, from the server device 4.

The controller 36 controls all the components and circuits (31 to 35) connected via the control bus 37, and controls all the circuits of the RFID wireless tag providing unit 3.

As shown in FIG. 2, the server device 4 includes a transmitting/receiving circuit 40 as a communication unit, a memory 41, and a controller 42. These components and circuits (40 to 42) are connected via a control bus 43.

When receiving a request for an electronic service from the RFID wireless tag providing unit 3 through the Internet line 5, the transmitting/receiving circuit 40 transmits information necessary for receiving the electronic service to the RFID wireless tag providing unit 3 through the Internet line 5. Further, the transmitting/receiving circuit 40 provides the cell phone 1 with the electronic service through the network line 5 based on the information necessary for receiving the electronic service transmitted from the cell phone 1.

The memory 41 stores a medium for an electronic service provided by the server device 3, and stores various information about the electronic service. As shown in FIG. 4, the various information about the electronic service is an ID number, a password, a service name, an available period, or the maximum frequency of use, for example. Incidentally, the memory 41 stores plural music data as the medium of the electronic service by way of example. However, the data is not limited to music, and the memory 41 may store other media, for example, moving pictures, photographs, documents, or game software.

The controller 42 controls the entire server device 4 inclusive of the transmitting/receiving circuit 40 and the memory 41.

Next, an operation of the electronic service providing system of this embodiment is described with reference to the accompanying drawings.

As shown in FIG. 1, a user who requests an electronic service sends a request for the desired electronic service, for example, desired contents to the server device 4 by using the RFID wireless tag providing unit 3. More specifically, a user selects and inputs information about an electronic service for desired contents (for example, desired music program or period) by use of the keyboard 33 of the RFID wireless tag providing unit 3 while checking data displayed on the display 31, and inserts a usage charge to a coin or bill slot.

Then, the transmitting/receiving circuit 35 of the RFID wireless tag providing unit 3 sends a request for a desired electronic service to the server device 4 through the network line 5. In this case, a password for browsing contents of the received electronic service maybe separately set while selecting a desired electronic service.

Next, as shown in FIG. 1, the server device 4 receives a request for an electronic service from the RFID wireless tag providing unit 3, and transmits an ID number or a password as information necessary for receiving the electronic service (hereinafter simply referred to as "necessary information") to the RFID wireless tag providing unit 3. To be specific, the server device 4 extracts an ID number, a password, or a service name (for example, music 1) or a playback period (available period) as shown in FIG. 4, from the memory 41, and transmits the extracted data as the necessary information to the RFID wireless tag providing unit 3.

Next, the RFID wireless tag providing unit 3 temporarily stores the necessary information received by the transmitting/receiving circuit 35 in the memory 32. To be specific, the RFID wireless tag providing unit 3 temporarily stores an ID number, a password, a requested service name (for example, music 1), a playback period (available period), or an address where the requested service is provided (for example, an address of the server device 3) in the memory 32. Incidentally, how much the necessary information is stored in the RFID wireless tag providing unit 3 is displayed on the display 31 all the time, and a user can grasp it by checking the data displayed on the display 31.

Next, as shown in FIG. 1, the RFID wireless tag providing unit 3 writes the necessary information to the RFID wireless tag 2 using the RFID writer 34 to provide a user with the RFID wireless tag 2 that records the necessary information. More specifically, after the RFID writer 34 writes the necessary information temporarily stored in the memory 32 to the memory 22 of the RFID wireless tag 2 under the control of the controller 36, the RFID wireless tag providing unit 3 transfers the RFID wireless tag 2 that records the necessary information to the slot of the RFID wireless tag 2.

Next, as shown in FIG. 1, a user attaches the RFID wireless tag 2 that records the necessary information, to the surface of the casing of the cell phone 1. Then, the user has the RFID reader 10 reading the necessary information stored in the memory 22 of the RFID wireless tag 2 by means of inputting a command by pressing the keyboard 15. As a result, the details of the necessary information are displayed on the display 11, and the user can confirm an ID number, a password, a service name, and an available period as the necessary information.

Next, as shown in FIG. 1, the user specifies a desired service (contents) (for example, music 1) from the necessary information displayed on the display 11, and selects an ID number corresponding to the service. The transmitting/receiving circuit 12 of the cell phone 1 transmits the selected ID number, password, or available period among the necessary information to the server device 4 through the Internet line 5. Prior to this transmission, the transmitting/receiving circuit 12 of the cell phone 1 is made to access the Web page operated by the server device 4 that provides the electronic service. Further, the transmitting/receiving circuit 12 of the cell phone 1 may access the Web page in parallel with the operation of reading data from the RFID wireless tag 2.

Next, the server device 4 that receives the selected ID number and password among the necessary information from the cell phone 1 compares the received ID number and password with an ID number and a password stored in the memory 41 to determine whether or not they are matched. As a result of comparison, if the IDs and passwords are matched, the transmitting/receiving circuit 40 of the server device 4 issues a notification to allow the provision of an electronic service to the cell phone 1 through the Internet line 5 as shown in FIG. 1, and transmits data about the service (for example, music data of the music 1) selected by the user as contents data. Then, the cell phone 1 stores the data about the service received by the transmitting/receiving circuit 12 (for example, music data of the music 1) in the memory 13 together with associated information like the available period.

On the other hand, if the comparison result shows that the IDs and passwords are not matched, the transmitting/receiving circuit 40 of the server device 4 sends the notification to that effect to the cell phone 1 through the Internet line 5. At this time, the notification that the IDs and passwords are not matched is displayed on the display 11 of the cell phone 1.

The user reproduces the obtained contents data (for example, music data of the music 1) of the service by typing on the keyboard 3.

During playback, the controller 14 of the cell phone 1 checks the available period of the service stored in the memory 13 (for example, music 1). If the playback period is within the available period, the contents data of the service (for example, music data of the music 1) is reproduced; otherwise, a notification that the playback period exceeds the available period is displayed on the display 11.

Incidentally, the user can be provided with plural electronic services at a time. That is, necessary information about the plural electronic services may be stored in the RFID wireless tag 2.

As described above, the cell phone 1 receives an electronic service from the service device 4 through the network line 5 based on the necessary information stored in the RFID wireless tag 2, and thus can receive an electronic service from anywhere irrespective of place and service type.

Further, the necessary information used for receiving the electronic service from the server device 4 is provided in the form of being stored in the RFID wireless tag 2. Hence, plural cell phones can receive the electronic service by reattaching the RFID wireless tag 2 to another cell phone. In addition, in this case, the usage charge for the electronic service may be paid by the plural cell phones instead of a predetermined cell phone. Therefore, in an electronic prepaid system, for example, a cell phone that prepays a charge may be different from a cell phone used for authentication. If someone has plural cell phones, he/she can receive an electronic service using any of the plural cell phones.

According to such a system, a provider that provides an electronic service using the server device 4 limits the maximum frequency of use or the available period, making it possible to prevent such a situation that an electronic service (for example, music data of the music 1) is provided to the cell phone 1 of a user over the available period or the maximum frequency of use. As a result, it is possible to suppress illegal or pirated copy of the service.

Further, with this system, a provider that provides an electronic service using the server device 4 limits the maximum frequency of use or the available period, making it unnecessary to add cost for checking the illegal or pirated copy of the service to the price. Hence, it is possible to provide a user with an electronic service at lower cost.

The above embodiment describes that the RFID wireless tag 2 is attached to the cell phone 1 when in use but may be attached to a communication device such as a laptop personal computer or portable information terminal as long as the tag includes an RFID reader.

It is apparent that the present invention is not limited to the above embodiment, but may be modified and changed without departing from the scope and spirit of the invention.

What is claimed is:

1. An electronic service providing system, comprising: a terminal transmitting/receiving data to/from a wireless tag; a service device that transmits/receives data to/from the terminal through a network line to provide an electronic service to the terminal through the network line; and a wireless tag providing apparatus that transmits/receives data to/from the server device to provide necessary information for receiving the electronic service provided by the server device with the information stored in the wireless tag, the server device comprising a communication unit that receives a request for an electronic service from the wireless tag providing apparatus, transmits the necessary information for receiving the electronic service to the wireless tag providing apparatus, and provides the terminal with the electronic service based on the necessary information transmitted from the terminal through the network line, the wireless tag providing apparatus comprising: an input unit for sending the request for an electronic service to the server device through key entry; a communication unit for sending the request for the electronic service entered with the input unit and receiving the necessary information transmitted from the service device; and a wireless tag providing unit for writing the necessary information received with the communication unit into the wireless tag to provide the wireless tag that stores the necessary information, and the terminal comprising: a short-distance wireless communication unit for reading the necessary information stored in the wireless tag; and a communication unit that transmits/receives data to/from the server device based on the necessary information read by the short-distance communication unit to receive the electronic service from the server device through the network line.

2. The electronic service providing system according to claim 1, wherein the necessary information includes identification information of the electronic service provided by the server device.

3. The electronic service providing system according to claim 1, wherein the necessary information includes identification information or a password of the electronic service provided by the server device.

4. A wireless tag providing apparatus that transmits/receives data to/from a server device to provide necessary information for receiving the electronic service provided by the server device with the information stored in the wireless tag,
   an input unit that sends a request for an electronic service to the server device through key entry;
   a communication unit that sends the request for the electronic service entered with the input unit to the server device and receives the necessary information transmitted from the service device; and
   a wireless tag providing unit that writes the necessary information received with the communication unit into the wireless tag to provide the wireless tag that stores the necessary information.

5. The wireless tag providing apparatus according to claim 4, wherein the necessary information includes identification information or a password of the electronic service provided by the server device.

6. The wireless tag providing apparatus according to claim 4, wherein the necessary information includes identification information of the electronic service provided by the server device.

7. The electronic service providing system according to claim 1, wherein the wireless tag is a Radio Frequency Identification (RFID) wireless tag.

* * * * *